United States Patent [19]

Hoffman et al.

[11] 4,003,985

[45] Jan. 18, 1977

[54] PRODUCTION OF SODIUM SULFITE

[75] Inventors: Robert Joel Hoffman, Liverpool;
Samuel Louis Bean, Jamesville;
Philip Seeling, North Syracuse;
James William Swaine, Jr., Manlius,
all of N.Y.

[73] Assignee: Allied Chemical Corporation, Morris Township, N.J.

[22] Filed: Jan. 30, 1976

[21] Appl. No.: 653,876

[52] U.S. Cl. .................. 423/512 A; 423/242; 23/302 T
[51] Int. Cl.² .................................. C01D 5/14
[58] Field of Search ............. 423/512 A, 242, 184, 423/202; 23/302

[56] References Cited

UNITED STATES PATENTS

| 1,865,754 | 7/1932 | Hand | 423/512 A |
|---|---|---|---|
| 1,937,944 | 12/1933 | Butler | 423/512 A X |
| 2,719,075 | 9/1955 | Allen | 423/512 A X |
| 2,899,273 | 8/1959 | Murphy | 423/512 A X |
| 3,216,793 | 11/1965 | Spormann et al. | 423/512 A X |
| 3,305,307 | 2/1967 | Spormann et al. | 423/512 A |
| 3,622,443 | 3/1970 | Galeano | 423/512 A X |

FOREIGN PATENTS OR APPLICATIONS

| 45-12572 | 5/1970 | Japan | 423/512 A |
|---|---|---|---|

*Primary Examiner*—Jack Cooper
*Attorney, Agent, or Firm*—Gerhard H. Fuchs

[57] ABSTRACT

Anhydrous sodium sulfite is made by a process involving introducing substantially anhydrous sodium carbonate concurrently with sulfur dioxide-containing gas into a saturated solution of sodium sulfite maintained at pH of between about 6.5 and about 7.6 at temperature above about 35° C. to form a slurry of anhydrous sodium sulfite crystals, and withdrawing the crystals from the slurry. The process is initiated using a concentrated sodium sulfite solution containing less than about 3 ppm of dissolved iron.

11 Claims, 1 Drawing Figure

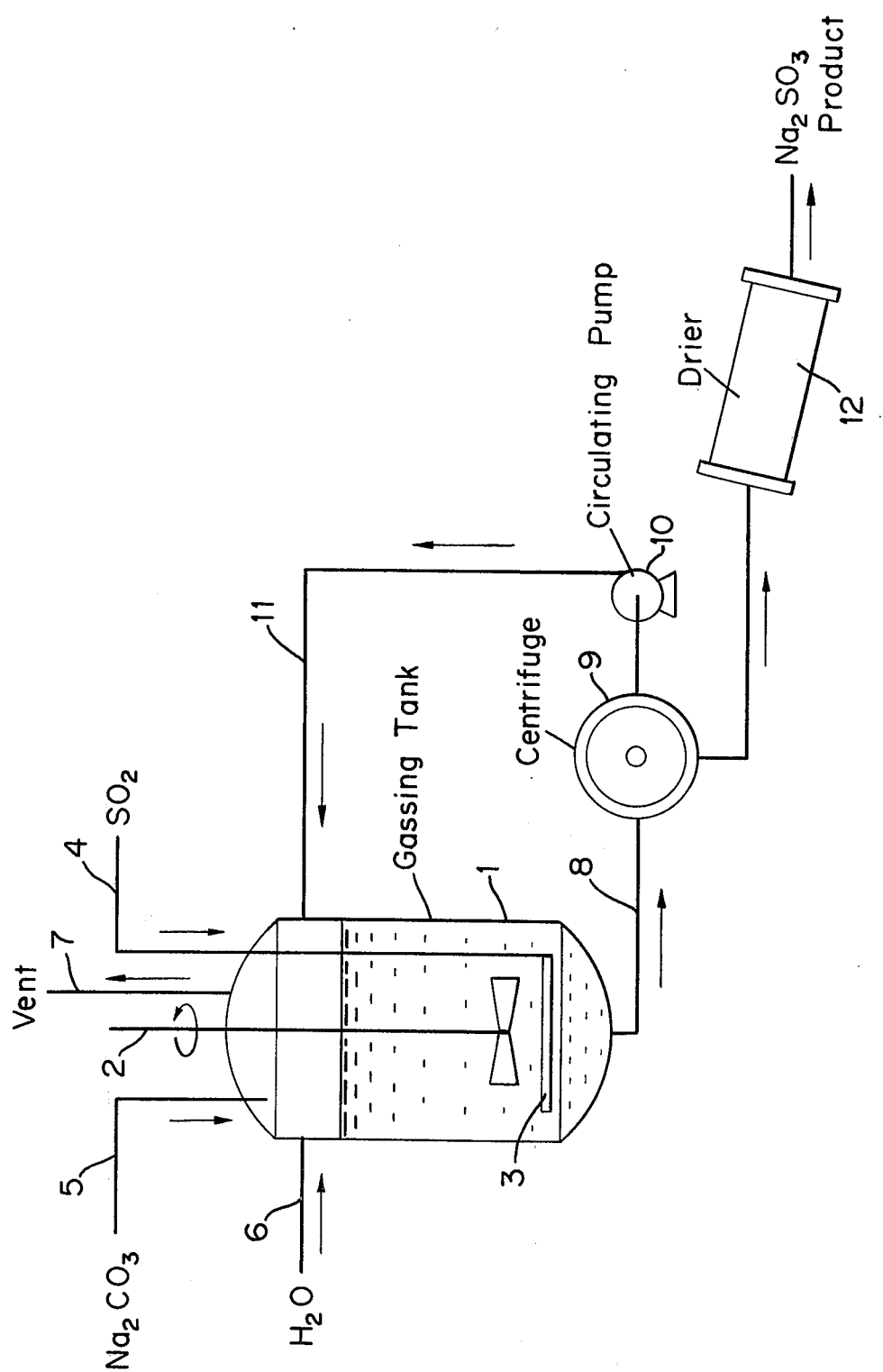

PRODUCTION OF SODIUM SULFITE

BACKGROUND OF THE INVENTION

Sodium sulfite is commonly made by reacting soda ash with sulfur dioxide in an aqueous medium. Sulfur dioxide-containing gas is passed through an aqueous solution of sodium carbonate to form a solution of sodium bisulfite, which is then neutralized, as by addition of further sodium carbonate or of sodium hydroxide to form the desired sodium sulfite. When sodium carbonate is used for neutralization, the solution is boiled to expel evolved carbon dioxide. From the neutralized solution sodium sulfite is obtained by crystallization. If crystallization is carried out below about 35° C., the crystals formed are sodium sulfite heptahydrate ($Na_2SO_3 \cdot 7H_2O$), which can be transformed into the anhydrous form by heating above about 35° C. At about that temperature the heptahydrate melts incongruently, forming anhydrous sodium sulfite and solution. Alternatively, crystallization of sodium sulfite from the neutralized solution can be conducted at temperatures above 35° C. by evaporating water from the solution, as by boiling it, in which case the crystals formed are anhydrous sodium sulfite. The process involved here, however, is a two step process: formation of sodium bisulfite in the first step, followed by neutralization thereof to form sodium sulfite in the second step. Processes for making sodium sulfite involving the above-described reactions have, for example, been described in U.S. Pat. No. 1,937,944 to Butler; U.S. Pat. No. 2,080,528 to Bowman et al.; U.S. Pat. No. 2,719,075 to Allen; U.S. Pat. No. 2,899,273 to Murphy; and U.S. Pat. No. 3,361,524 and 3,216,793 to Sporman et al. These patents generally are concerned with methods for obtaining anhydrous alkali metal sulfite of relatively high degree of purity, hence include certain further purification steps not of consequence here.

Single-step processes for making anhydrous sodium sulfite are also known and have been described, for example, in U.S. Pat. No. 3,305,307 to Sporman et al, and U.S. Pat. No. 3,213,412 to Carey et al. According to the Sporman et al. patent, solid alkali metal sulfite salt is obtained by contacting an aqueous solution of a suitable alkali metal compound — such as sodium hydroxide, sodium carbonate, sodium bicarbonate, and the like — with substantially dry sulfur dioxide-containing gas at temperature sufficiently high that the water introduced with the solution and formed by the reaction of the alkali metal compound with the sulfur dioxide is immediately vaporized. The patent to Carey describes a process wherein an alkali metal salt, such as carbonate of soda, is moistened by contact with a small quantity of water or steam, and the moistened salt is subjected to the action of sulfur dioxide-containing gas. Processes of that kind, however, result in formation of sodium sulfite of relatively low degree of purity, as discussed by Carey et al. in U.S. Pat. No. 3,213,412.

It is an object of the present invention to provide a method for producing anhydrous sodium sulfite by reaction of sodium carbonate with sulfur dioxide in an aqueous medium to obtain crystalline anhydrous sodium sulfite in one-step procedure.

It is a further object of the present invention to provide a method for obtaining substantially concentrated solutions of sodium sulfite of high degree of purity from which sodium sulfite crystals, both anhydrous as well as heptahydrate, may be crystallized in substantially pure form.

SUMMARY OF THE INVENTION

In accordance with the present invention there is provided a method for producing anhydrous sodium sulfite comprising a. forming a saturated aqueous solution of sodium sulfite containing less than about 3 ppm of dissolved iron, basis the solution, and adjusting the pH of said solution to within the range of from about 6.5 to about 7.6;

b. introducing into said solution substantially anhydrous sodium carbonate concurrently with a sulfur dixoide-containing gas stream so proportioned with respect to each other as to maintain the pH of said solution within the range of from about 6.5 to 7.6 while maintaining the temperature of said solution above about 35° C. to form a slurry of anhydrous sodium sulfite crystals; and c. withdrawing anhydrous sodium sulfite crystals from said slurry.

We have made the surprising discovery that sodium sulfite can be made in a one-step process by contacting sodium carbonate and sulfur dioxide in an aqueous medium, provided the process is initiated in a saturated aqueous solution of sodium sulfite which contains less than about 3 ppm of dissolved iron, and provided further it is conducted within a certain critical pH range. We have found that if the initial sodium sulfite solution contains more than about 3 ppm of iron, addition thereto of sodium carbonate and sulfur dioxide will result in formation of a supersaturated solution of sodium sulfite. Supersaturation seems to be carried to relatively high degree, and seems to persist for relatively extended periods of time, until it is released by sudden precipitation of a dense shower of sodium sulfite crystals of extremely fine particle size, resulting in formation of an intractible mass from which usable sodium sulfite crystals cannot be recovered by practical methods, such as filtration. We believe that this is the reason why workers in the art heretofore had resorted to either the above-described two step processes for making sodium sulfite, involving first formation of sodium bisulfite, followed by neutralization thereof to form sodium sulfite, or to those processes involving formation of sodium sulfite in substantially dry state.

We have further discovered that once reaction of sodium carbonate with sulfur dioxide has been initiated in a saturated aqueous solution of sodium sulfite containing less than about 3 ppm of dissolved iron, basis the solution, and crystals of anhydrous sodium sulfite are being formed, then iron may be introduced into the reaction medium, as e.g. an impurity in the sodium carbonate, without adverse effect on further formation of sodium sulfite crystals. Indeed, we have surprisingly found that when sodium sulfite is crystallized at elevated temperature above about 35° C. and up to the boiling point of the solution from a saturated solution of sodium sulfite containing dissolved iron as impurity, then the iron reports almost quantitatively to the sodium sulfite crystals being precipitated, leaving a sodium sulfite mother liquor practically free of iron, that is containing non-detectible amounts of iron as determined by the ammonium thiocyanate test. Thus, we have found that in the method of our invention for producing anhydrous sodium sulfite it is only critical that the reaction between the sodium carbonate and the sulfur dioxide be initiated in an aqueous medium containing less than about 3 ppm of dissolved iron, basis the solution, but that once crystal formation is under way, the process is capable of tolerating input of substantial amounts of iron, which will be included in the sodium sulfite product as an impurity.

We have further found that in the method of producing anhydrous sodium sulfite in accordance with our invention the pH of the aqueous reaction medium must be critically maintained within the range of from about 6.5 to about 7.6. If the pH is permitted to go above about 7.6 for substantial periods of time while the process is in progress, conversion of the sodium carbonate to sodium sulfite is inhibited or does not occur at all. If, on the other hand, the pH is permitted to fall below about 6.5 for substantial periods of time, sodium bisulfite is formed at rapidly increasing rate, which appears to inhibit growth of sodium sulfite crystals, resulting in formation of excessive amounts of small crystals which cannot readily be separated from the reaction medium, coupled with excessive foaming of the reaction medium.

Further, the method of producing anhydrous sodium sulfite in accordance with our invention must be conducted at temperatures above about 35° C. and up to the boiling point of the reaction medium. If conducted below about 35° C., anhydrous sodium sulfite does not crystallize from the reaction medium but the sodium sulfite heptahydrate is obtained instead.

BRIEF DESCRIPTION OF THE DRAWING

For purposes of explaining this invention and presenting one specific embodiment thereof, reference is made to the accompanying drawing which represents a simplified schematic flow diagram of an embodiment of the present invention showing a continuous process for making sodium sulfite.

DETAILED DESCRIPTION OF THE INVENTION, OF THE PREFERRED EMBODIMENTS AND OF THE BEST MODE PRESENTLY CONTEMPLATED FOR ITS PRACTICE

With reference to the drawing, equipment employed in the embodiment of the process of the present invention thereby illustrated includes gassing tank 1, agitator 2, sparger 3 connected to sulfur dioxide-containing gas feed line 4, soda ash feed line 5, water feed line 6, and vent 7, all associated with gassing tank 1. Equipment further includes centrifuge 9 for separating liquid and solid phases of the slurry from gassing tank 1, circulating line 10 for returning mother liquor to gassing tank 1, and dryer 12. Desirably, the equipment is constructed of corrosion resistant material such as stainless steel.

On start-up of operation, there is provided in gassing tank 1 a saturated solution of sodium sulfite. It is essential that the solution contains less than about 3 ppm of dissolved iron, basis the solution. Sodium sulfite solution of such low iron content may, for example, be prepared by dissolving iron-free sodium sulfite in water. Alternatively, such solution may be prepared by subjecting a concentrated solution of sodium sulfite containing more than about 3 ppm of dissolved iron, basis the solution, to crystallization at temperature above about 35° C. as by boiling the solution to precipitate anhydrous sodium sulfite crystals therefrom, and separating the sodium sulfite crystals from the mother liquor. The mother liquor from which sodium sulfite crystals have been thus separated will be essentially iron-free, that is to say it will contain less than about 3 ppm of dissolved iron. Such iron-free sodium sulfite solution may also be prepared by reacting iron-free sodium carbonate with sulfur dioxide-containing gas in aqueous solution at pH in the neighborhood of about 7 in substantially iron-free water. In any event, the method by which the saturated sodium sulfite solution containing less than about 3 ppm iron, basis the solution, is prepared is not critical.

In operation of the embodiment illustrated by the drawing, the substantially iron-free (containing less than about 3 ppm of dissolved iron, basis the solution) concentrated sodium sulfite solution in gassing tank 1 is adjusted to pH within the range of from about 6.5 to about 7.6, as by addition of soda ash or sodium hydroxide if its pH is below about 6.5, or as by bubbling sulfur dioxide-containing gas through it, if its pH is above about 7.6. It is heated to temperature above about 35° C. by means of heating equipment (not shown). Soda ash is introduced into gassing tank 1 via soda ash feed line 5 while concurrently sulfur dioxide-containing gas is bubbled through the solution by means of sparger 3. Inert gases, such as nitrogen, which may be introduced with the sulfur dioxide-containing gas stream, as well as carbon dioxide formed in the reaction between the sodium carbonate and sulfur dioxide in accordance with the equation

$$Na_2CO_3 + SO_2 \rightarrow Na_2SO_3 + CO_2$$

are vented from gassing tank 1 through vent 7. Substantially anhydrous sodium carbonate in the form of light or dense soda ash, preferably dense soda ash, and sulfur dioxide-containing gas are fed to gassing tank 1 so proportioned with respect to each other as to maintain the pH of the solution within gassing tank 1 within the range of from about 6.5 to about 7.6 throughout the operation. This can be simply accomplished by continually or intermittently monitoring the pH, as by means of a pH meter, and adjusting either one or both of the soda ash and sulfur dioxide feed responsive to changes in the pH. Thus, should the pH tend to increase and threaten to become more basic than indicated by pH of 7.6, one could reduce the soda ash feed rate or increase the sulfur dioxide feed rate, or make both adjustments concurrently. Conversely, should the pH tend to drift towards the acidic side, one could increase the soda ash feed rate or decrease the sulfur dioxide feed rate, or both.

The temperature within the vessel during the gassing operation must be maintained above about 35° C. Ordinarily, the heat of reaction between the soda ash and the sulfur dioxide will be sufficient to maintain the temperature at that level. However, under certain circumstances it may be necessary or desirable to apply heat to gassing tank 1 to maintain temperature above about 35° C.

As the soda ash and sulfur dioxide are being fed to the saturated aqueous solution of sodium sulfite in the gassing tank, anhydrous sodium sulfite will precipitate in crystalline form, forming a slurry of sodium sulfite crystals in saturated sodium sulfite mother liquor. The crystals are held in suspension by means of agitator 2. Crystal slurry is withdrawn from gassing tank 1 via slurry line 8 and fed to centrifuge 9 wherein liquid and solid phases are separated. The liquid phase (sodium sulfite mother liquor) is returned to gassing tank 1 by means of circulating pump 10 via mother liquor return line 11. Crystals of anhydrous sodium sulfite which are separated in centrifuge 9 may, if desired, be washed using small amounts of water to remove adhering mother liquor, and the crystals so washed may then be dried in dryer 12, as by intimately contacting them with heated air to obtain dry anhydrous sodium sulfite product. Liquor level within the system is maintained constant by adding water, as required, via water feed line 6 to gassing tank 1, although water may also be introduced to other points within the system (not shown), if desired.

Any commercial form of sodium carbonate (soda ash) is suitable for use in our process. We have found, however, that that form of commercial grade sodium carbonate known as dense soda ash is particularly desirable for use in our process, since dense soda ash readily disperses and dissolves in the reaction medium and reacts quickly with the sulfur dioxide. Commercial grade light soda ash is also suitable. However, its use seems to require more efficient agitation of the reaction medium, or else the soda ash tends to agglomerate and to acquire a surface coating of sodium sulfite, which seemingly retards the rate of reaction. For these reasons we prefer to use dense soda ash. It should be understood, however, that water-containing crystalline forms of sodium carbonate are also suitable for use in our process, subject only to the limitation that the water introduced with the sodium carbonate may not be of such amount as to upset the water balance in the system. Thus, sodium carbonate monohydrate is suitable for use in our process. It is also possible to partially substitute sodium bicarbonate, sodium hydroxide, or sodium bisulfite for the sodium carbonate, in solid form or in solution, and the appended claims are intended to cover partial use of such materials in our process.

Sulfur dioxide-containing gas suitable for use in our process may be obtained from any convenient source, such as combustion of sulfur or roasting of sulfide ores. The volume ratio of sulfur dioxide in the sulfur dioxide-containing gas is not critical. Sulfur dioxide-containing gas may contain as little as about 1 percent by volume of sulfur dioxide, or it may consist of 100 percent sulfur dioxide. In usual commercial plant operation, sulfur dioxide-containing gas as obtained by combustion of sulfur or roasting of sulfide ores usually contains about 8 to about 20 percent by volume of sulfur dioxide. If desired, the sulfur dioxide-containing gas stream may, prior to introduction into the process, be purified, e.g. by removal of dust therefrom as by scrubbing, precipitation or filtration, or by washing it so as to minimize contamination of the process liquor.

The process of our invention can be effectively conducted at pH within the range of from about 6.5 to about 7.6, is preferably conducted at pH within the range of from about 7.0 to 7.5 and, more preferably yet, within the range of from about 7.25 to 7.45.

Preferably, the reaction between the sodium carbonate and the sulfur dioxide in accordance with our invention is initiated in an aqueous medium containing less than about 2 ppm of dissolved iron, basis the solution and, more preferably yet, in an aqueous medium containing less than about 1 ppm of dissolved iron.

The temperature of the reaction medium wherein sodium sulfite is formed in accordance with the method of our invention must be maintained above about 35° C., or else anhydrous sodium sulfite is not obtained but instead crystals formed in the liquor will be those of the sodium sulfite heptahydrate, $Na_2SO_3 \cdot 7H_2O$. The upper temperature limit is the boiling point of the reaction medium at prevailing pressure conditions. The preferred temperature range is from about 50° to about 80° C. The reaction may be conducted under subatmospheric or superatmospheric pressure, as desired, although ordinarily atmospheric pressure conditions would be preferred for the sake of convenience.

The concentration of solid sodium sulfite crystals within the reaction medium may vary within wide ranges, depending on the ability of the agitator to maintain the suspension of sodium sulfite crystals sufficiently homogeneous. Typical solids concentration may range from about 1 to about 60 percent by volume, preferably from about 20 to 40 percent by volume.

EXAMPLE I

A stainless steel reactor equipped with agitator, temperature control and sparger for introducing sulfur dioxide-containing gas, having a volume of 10 gallons and a working capacity of about 9 gallons, is charged with about 9 gallons of a saturated solution of sodium sulfite at temperature of about 60° C., containing less than about 1 ppm of dissolved iron, basis the solution. Under constant agitation commercial grade dense soda ash is charged to the reactor at the rate of 16 grams per minute, while concurrently sulfur dioxide-containing gas containing about 20 percent by volume of sulfur dioxide is sparged through the liquor within the reactor at a rate sufficient to provide 9.7 grams per minute of sulfur dioxide. Throughout the operation the temperature of the liquid reaction medium within the reactor is maintained at temperature between 50° and 75° C., and its pH is controlled between about 7.2 and 7.5 by making minor adjustments on the soda ash and sulfur dioxide feed rates. Solids of anhydrous sodium sulfite crystallize from the reaction medium at the rate of about 19 grams per minute as the soda ash and the sulfur dioxide-containing gas are fed to the reactor. These crystals are permitted to accumulate within the reaction medium to solids level of between about 14 to 40 percent by volume. Periodically, liquid reaction medium is withdrawn from the reactor, sodium sulfite crystals are separated from the mother liquor by filtration and the mother liquor is returned to the reactor, thereby maintaining the crystal volume within the reactor between about 14 and 40 percent by volume.

During a run of continuous operation, liquor samples are taken at approximately two-hour intervals, crystals and mother liquor are separated and the concentration within the mother liquor of sodium sulfite ($Na_2SO_3$) and sodium bisulfite ($NaHSO_3$) are determined. Results are shown in Table I, below.

TABLE

| Sample | pH | $Na_2SO_3$ (% by wt.) | $NaHSO_3$ (% by wt.) |
|---|---|---|---|
| 1 | 7.00 | 24.41 | 2.15 |
| 2 | 7.15 | 23.30 | 1.73 |
| 3 | 7.35 | 22.73 | 0.93 |
| 4 | 7.15 | 22.91 | 1.52 |
| 5 | 7.60 | 24.94 | 0.59 |
| 6 | 7.45 | 25.04 | 0.33 |
| 7 | 7.20 | 23.53 | 0.73 |
| 8 | 7.35 | 23.85 | 0.57 |
| 9 | 7.35 | 23.39 | 0.79 |

The anhydrous sodium sulfite thus obtained contains 98.2 percent by weight of $Na_2SO_3$; 1.5 percent by weight of $NaHSO_4$; and 5.5 ppm iron. The pH of a 5 percent solution thereof is 10.1. The product consists of white crystals; a 20 percent solution of the solids in water is clear. The product has the following screen analysis:

| Mesh (U.S. Screen) | % |
| --- | --- |
| on 30 | 0.7 |
| 40 | 3.1 |
| 60 | 36.7 |
| 100 | 38.0 |
| 200 | 19.1 |
| 325 | 2.4 |
| through 325 | — |

The product is of good commercial quality.

As above described, the process of the present invention is initiated using a saturated sodium sulfite solution containing less than about 1 ppm dissolved iron, basis the solution. Such solution may, as above described, be obtained by evaporating water from an aqueous solution of sodium sulfite containing in excess of 1 ppm of dissolved iron, basis the solution, as by boiling, to cause precipitation of anhydrous sodium sulfite crystals therefrom, and separating the anhydrous sodium sulfite crystals. During the formation of the sodium sulfite crystals, iron and calcium impurities unexpectedly become associated with the growing crystals and are thereby removed from the solution. It is, of course, then possible to further evaporate the purified liquor to obtain a further crop of anhydrous sodium sulfite crystals, which are of purity suitable for use in photographic applications. Purification of sodium sulfite solutions by this method is most effectively carried out by evaporating water from such solutions, as by boiling at temperature in the order of 102° to 104° C. Temperatures less than boiling are also suitable, but not ordinarily desirable because of the lower evaporation rate of the water.

Purification of sodium sulfite solution by this method is illustrated by Experiment 1, set forth below.

EXPERIMENT 1

Eight gallons of sodium sulfite solution containing 15 ppm dissolved iron and 45 ppm dissolved calcium, basis the solution, are heated to boiling under agitation for a period of 3 hours. During this period, sodium sulfite crystallizes from the solution, forming crystals in amounts of about 6 percent by volume of the combined volume of crystals and liquor. Analysis of iron and calcium in the crystals and the liquor are shown in Table II below:

TABLE II

| Sample | Fe (ppm) | Ca (ppm) |
| --- | --- | --- |
| Original Solution | 15 | 45 |
| Purified Solution | 3 | 15 |
| Solids Obtained | 84 | |

Experiment 2 set forth below further illustrates purification of sodium sulfite solution by the above-described method.

EXPERIMENT 2

Saturated sodium sulfite solution containing 27 ppm dissolved iron is heated to boiling, causing precipitation of sodium sulfite crystals as a result of evaporation of water therefrom. Samples of the solution are taken on periodic basis, crystals and mother liquor are separated, and the mother liquor is analyzed for iron and calcium. Results are summarized in Table III below:

TABLE III

| Time, Minutes | Fe (ppm) | Ca (ppm) |
| --- | --- | --- |
| 0 | 27 | 0.8 |
| 15 | 26 | 1.0 |
| 30 | 23 | 1.4 |
| 50 | 3.5 | 0.6 |
| 80 | <1 | 0.6 |

As these experiments demonstrate, evaporation of water at elevated temperature to effect crystallization of anhydrous sodium sulfite from a concentrated solution thereof containing in excess of 1 ppm of dissolved iron, basis the solution, is an effective means for providing a concentrated sodium sulfite solution containing less than 1 ppm of dissolved iron, basis the solution, suitable for use as starting liquor for making anhydrous sodium sulfite in accordance with the method of our invention.

Since various changes may be made in carrying out the process of our invention without departing from its scope and essential characteristics, all matter contained in the above description shall be interpreted as illustrative only, the scope of our invention being defined by the appended claims.

We claim:

1. The method of producing anhydrous sodium sulfite comprising:
    a. forming a saturated aqueous solution of sodium sulfite containing less than about 3 ppm of dissolved iron, basis the solution, and adjusting the pH of said solution to within the range of from about 6.5 to about 7.6;
    b. introducing into said solution substantially anhydrous sodium carbonate concurrently with a sulfur dioxide-containing gas stream, so proportioned with respect to each other as to maintain the pH of said solution within the range of from about 6.5 to about 7.6, while maintaining the temperature of said solution above about 35° C. to form a slurry of anhydrous sodium sulfite crystals; and
    c. withdrawing anhydrous sodium sulfite crystals from said slurry.

2. The method of claim 1 wherein the saturated aqueous solution of sodium sulfite contains less than about 1 ppm of dissolved iron.

3. The method of claim 1 wherein in step (b) the pH of the solution is maintained within the range of from about 7.0 to 7.5.

4. The method of claim 1 wherein in step (b) the temperature of the solution is maintained between about 50° and 80° C.

5. The method of claim 1 wherein the sodium carbonate is dense soda ash.

6. The method of claim 1 wherein in step (b) the pH of the solution is maintained within the range of from about 7.25 to about 7.45.

7. The method of claim 1 wherein the saturated aqueous solution of sodium sulfite contains less than about 2 ppm of dissolved iron.

8. The method of claim 7 wherein the sodium carbonate is dense soda ash, and wherein in step (b) the pH of the solution is maintained within the range of from about 7.25 to about 7.45.

9. The method of claim 8 wherein in step (b) the temperature of the solution is maintained between about 50° and 80° C.

10. The method of claim 1 wherein the saturated aqueous solution of sodium sulfite contains less than about 1 ppm of dissolved iron, wherein the sodium carbonate is dense soda ash, and wherein in step (b) the pH of the solution is maintained within the range of from about 7.25 to about 7.45, and the temperature of the solution is maintained between about 50° and about 80° C.

11. The method of claim 1 wherein the saturated solution of sodium sulfite containing less than about 3 ppm of dissolved iron has been obtained by evaporating water from an aqueous solution of sodium sulfite containing in excess of about 3 ppm of dissolved iron, basis the solution, at temperature above about 35° C. to cause precipitation of anhydrous sodium sulfite crystals therefrom, and separating the anhydrous sodium sulfite crystals from the solution.

* * * * *